Sept. 6, 1932.    S. L. STARKEY    1,876,474
DEVICE FOR MAKING DRIP COFFEE
Filed Nov. 24, 1930
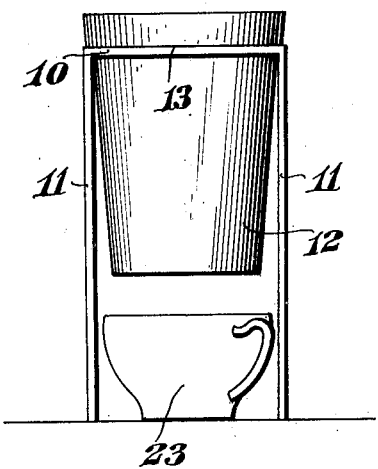
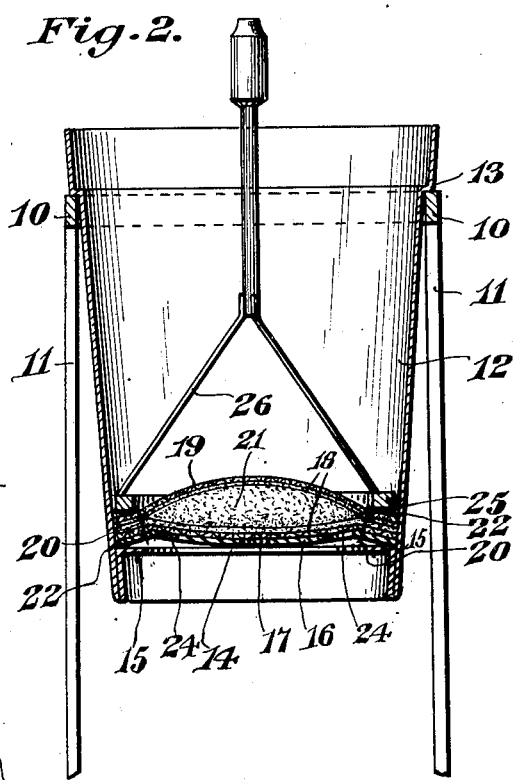
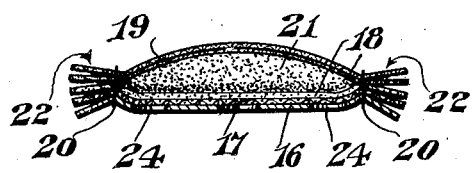
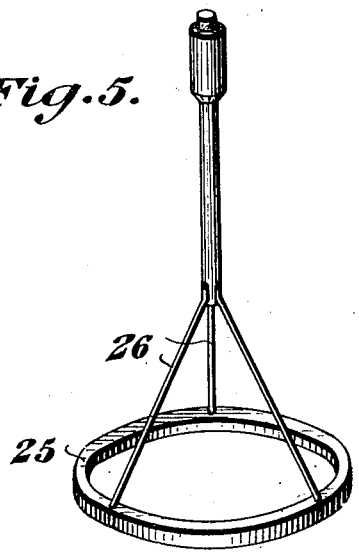
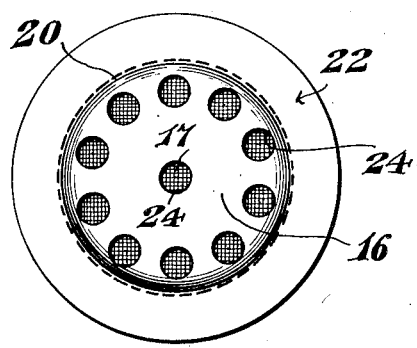
INVENTOR.
S. L. Starkey,
BY
ATTORNEY.

Patented Sept. 6, 1932

1,876,474

UNITED STATES PATENT OFFICE

SHIRLEY L. STARKEY, OF PARKERSBURG, WEST VIRGINIA

DEVICE FOR MAKING DRIP COFFEE

Application filed November 24, 1930. Serial No. 497,874.

The invention relates to a device for the making of drip coffee, tea or other beverages without the use of the usual or well known types of utensils now employed for that purpose.

It is generally conceded that drip coffee or tea is the most desirable as possessing strength and flavor but it has been curtailed because of the complicated methods of making the same, and the disposal of the spent grounds or resultant waste, as well as the inconvenience in cleansing of the utensils after use, aside from variance in the character, both in strength and flavor, of the finished product.

The primary object of the invention is the provision of a device of this character, wherein the substance of determined quantity to constitute the infusions or constituents of the liquid beverage is confined in a cartridge or container which is adaptable for placing in a receiver of simplified form having a definite capacity for water or other liquid and compelling penetration, seeping or passing thereof through the substance but once and the direct deposit of the solution within a receptacle or cup for ready drinking or consumption, the spent cartridge or container then being discarded, thereby eliminating the difficulties heretofore experienced in disposing of the grounds or spent substance and inconvenience in the cleaning of the utensil employed under procedures of well known methods.

Another object of the invention is the provision of a device of this character, wherein the receiver for water or other liquid is of novel form whereby the cartridge or container for the substance to be leached will snugly fit said receiver to effect a fluid-tight joint therebetween so as to avoid leakage of the liquid about the cartridge or container which is also of novel form thereby causing the passage of such liquid but once through the substance so that a full strength drip beverage will result free from sediment or grounds, the receiver being extremely simple to permit quick and easy cleaning thereof after use while the cartridge or container will retain the spent substance, enabling convenient disposal thereof without scattering or separation.

A further object of the invention is the provision of a device of this character, wherein the strength of the beverage can be controlled; brand and amount of substance used regulated, thereby relieving waste; timing to obtain the finished product, either instantaneously or within a determined period; and the procuring of a definite quantity of such beverage in a single operation.

A still further object of the invention is the provision of a device of this character, wherein a full flavored drip beverage will be obtainable without waste of the substance, the procuring of a determined quantity of such beverage of full strength from a single charge and the retention of the substance when spent for the easy disposal of same.

A still further object of the invention is the provision of a device of this character, which is extremely simple in construction, thoroughly reliable and efficient in operation, convenient for use, economical, and inexpensive to manufacture.

With the above and other objects in view the invention consists in the features of construction, combination and arrangement of parts as will be hereinafter more fully described, illustrated in the accompanying drawing and pointed out in the claims hereunto appended.

In the accompanying drawing:

Figure 1 is a side elevation of a device constructed in accordance with the invention, a drinking receptacle or cup being shown in association therewith.

Figure 2 is a fragmentary vertical longitudinal sectional view through the device.

Figure 3 is a plan view of the cartridge or container carrying the substance.

Figure 4 is a vertical sectional view thereof.

Figure 5 is a perspective view of the cartridge or container anchoring element for use in the receiver of the device.

Similar reference characters indicate corresponding parts throughout the several views in the drawings.

The illustrated embodiment of the invention, which is the preferred form as others are contemplated, is adaptable particularly for the making of coffee.

In this embodiment there is shown a holder comprising in this instance a head ring 10, elevated and supported the required height from a foundation or table (not shown) by legs 11 which are either integrally formed therewith or otherwise joined thereto, the holder being preferably made from metal, although it may be made from any other material found desirable.

Within the ring 10 of the holder is adapted to be removably fitted a receiver, preferably made from metal, although it may be made of crockery or in fact it may be made from water-proof papers, which in the latter instance will permit the discarding thereof after a single use. This receiver is formed with a downwardly tapered solid walled circular body 12 being fully open at its top or upper end, the latter being provided with an outturned rim or flange 13 to present an external annular ledge to engage the ring 10 of the holder so that the receiver will be supported suspended thereby.

This body 12 at its bottom or lower end is formed with a central opening 14 circumscribed by an annular inturned seat 15 concentrically of said opening for a purpose presently described.

Insertable into the receiver is a cartridge or container for the substance from which infusion is to be formed, in this instance the substance is coffee, ground or pulverized, such cartridge or container being in its make-up a package including a non-porous water resisting paper disk like base 16 having thereon a correspondingly shaped inner ply of cheese cloth 17 covered by filter sheets of paper 18 and an outer ply of cheese cloth 19, these being fastened together at 20 as a unit so as to pocket between confronting filter sheets 18 and the inner and outer plies of cheese cloth 17 and 19 a determined quantity of coffee 21, the fastener being of any desirable kind and equally spaced circumferentially from the free edge of the base 16 to provide a marginal annular sealing apron or flap 22 relatively stiff and adapted to be folded slightly downwardly for contact with the seat 15 at the lower open end of the receiver when the cartridge or container is placed therein, so that the weight of the quantity of water introduced into the said receiver will compress this sealing apron or flap 22 against the seat 15 interiorly of the receiver and effect a fluid-tight joint between the said cartridge or container and the receiver that the water or other liquid therein will be compelled to penetrate or pass through the substance, in this instance coffee 21, pocketed in the cartridge or container without leakage about the latter for discharge through the opening 14 in the bottom or lower end of the receiver and be deposited in a drinking receptacle or cup 23 placed beneath the said receiver when in the holder therefor.

The base 16 of the cartridge or container is provided with suitable sized perforations 24 for the leaching of the substance in the pocket formed in the cartridge or container. The pocket is to be formed to take care of the swelling of the substance when subjected to liquid, so that the breaking or rupture of the cartridge or container is avoided and the water permitted to percolate more freely during this period. The liquid is introduced into the receiver through its upper open end.

To assure a positive fluid tight joint between the receiver and cartridge or container, if it be found desirable, there is provided for use a weighted anchoring element comprising a flattened annular member 25 corresponding in diameter to the inner circumference of the lower end of the receiver and this member is joined with a handle or bail 26 for convenience in placing it within and removal from the receiver, the anchoring element being shown in proper position in Figure 3 of the drawing to have the member 25 weigh upon the cartridge or container within the receiver, thus it being seen that a sure seating of said cartridge or container is had.

In the use of the device, the receiver is placed in the holder and a drinking receptacle or cup disposed beneath the lower open end of the latter, the cartridge or container loaded with pulverized coffee is then placed in the receiver so that the apron or flap 22 will be directed downwardly for contact with the seat 15, and the upright wall 12, it being understood that the perforated base 16, of this cartridge or container is lowermost on the introduction of said cartridge or container and the latter is firmly seated in the lower end of the receiver. Now a determined quantity of water or other liquid is poured into the receiver through its upper open end and this column of water or other liquid compels the apron or flap 22 to seal the cartridge or container within the receiver to avoid leakage of the water or other liquid about said cartridge or container so that the column of water or other liquid will pass directly through the substance pocketed in the cartridge or container for infusion and drip into the drinking receptacle or cup. If found necessary the anchoring element may be superimposed upon the cartridge or container when within the receiver to assure a perfectly tight joint therebetween. The result is that the water or other liquid is compelled to pass entirely through the pocketed coffee and all is substantially equally presented to the pulverized coffee and the contact of the water being long enough to take up its beneficial extracts but is not in contact long enough to dissolve its harmful ingredients. In this manner, although the water or other liquid passes but once through the coffee, liquid coffee of the finest flavor may be obtained and it is found that substantially all of the beneficial materials in coffee can be extracted with the single passage of the water therethrough.

The use of the cartridge or container enables the material being leached to be introduced into the device and removed therefrom without ever losing control of the material, the used coffee grounds being perfectly removed by simply removing the cartridge or container. Thus not only is the operation of charging and the making of the drip coffee simplified, but an infusion is obtained for a true mild coffee flavor, and the charge being leached is assured of thorough and equal treatment by the water or other liquid. Regulating the size of the cartridge or container, that is the pocket therein is a convenient and accurate means for measuring the proper amount of coffee or other material to form the desired quantity of the infusion. The device is of great simplicity and can be used out of doors. The cartridges or containers in their form enables convenient packaging of the same as they may be stored in sealed cartons which will assure freshness, ready marketing and safety of transportation.

It is to be understood that changes, variations and modifications may be made without departing from the spirit of the invention or sacrificing any of its advantages as come properly within the scope of the appended claims. For instance, the cartridge or container may be loaded with more than a single substance, such for example, as with coffee and milk in a dried state, as well as sugar.

What is claimed is:—

1. A device of the kind described, comprising a liquid receiver open at its top and bottom, a substance charged cartridge removably seated in the open bottom of the receiver and sealed marginally therein at its seat, and means for suspending the receiver directly over a receptacle, said cartridge having a non-porous perforated bottom with superposed upper and lower pervious fabric and filter materials, and means for permanently joining such materials removed from their marginal edges to provide centrally thereof a pocket for a substance charge.

2. The combination of an open bottom liquid receiver, a substance charged cartridge therefor, comprising a non-pervious perforated bottom disk, upper and lower fabric disks thereon, upper and lower filter paper disks between the fabric disks, means joining the bottom and upper and lower disks to provide a pocket for permanently containing a substance between the filter disks.

3. The combination of an open bottom liquid receiver, a substance charged cartridge therefor, comprising a non-pervious perforated bottom disk, upper and lower fabric disks thereon, upper and lower filter disks between the fabric disks, means joining the bottom and upper and lower disks together to provide a pocket for permanently containing a substance between the filter disks, said means being spaced from the margins of the disks to form a marginal apron to effect a seal between the said cartridge and receiver on insertion of the cartridge within the latter to confront the open bottom of the receiver.

In testimony whereof I affix my signature.

SHIRLEY L. STARKEY.